(12) United States Patent
Kausik et al.

(10) Patent No.: US 7,159,014 B2
(45) Date of Patent: Jan. 2, 2007

(54) METHOD AND SYSTEM FOR EFFICIENT AND AUTOMATED VERSION MANAGEMENT OF EMBEDDED OBJECTS IN WEB DOCUMENTS

(75) Inventors: Balas Natarajan Kausik, Los Gatos, CA (US); Janardhanan Jawahar, San Jose, CA (US)

(73) Assignee: Fineground Networks, Cupertino, CA (US)

( * ) Notice: Subject to any disclaimer, the term of this patent is extended or adjusted under 35 U.S.C. 154(b) by 643 days.

(21) Appl. No.: 09/998,173

(22) Filed: Dec. 3, 2001

(65) Prior Publication Data
US 2002/0194382 A1    Dec. 19, 2002

Related U.S. Application Data

(60) Provisional application No. 60/295,922, filed on Jun. 4, 2001.

(51) Int. Cl.
G06F 15/16    (2006.01)

(52) U.S. Cl. ...................... 709/217; 709/229

(58) Field of Classification Search ........ 709/212–219, 709/226–229; 707/513; 711/118, 122
See application file for complete search history.

(56) References Cited

U.S. PATENT DOCUMENTS

| | | | |
|---|---|---|---|
| 5,754,766 A | 5/1998 | Shaw et al. ............... 395/200.3 |
| 5,778,372 A | 7/1998 | Cordell et al. ............... 707/100 |
| 5,862,220 A | 1/1999 | Perlman ...................... 380/21 |
| 5,880,740 A | 3/1999 | Halliday et al. ............. 345/435 |
| 5,918,239 A | 6/1999 | Allen et al. .................. 707/526 |
| 6,006,227 A | 12/1999 | Freeman et al. ................ 707/7 |
| 6,011,905 A | 1/2000 | Huttenlocher et al. ....... 395/102 |
| 6,018,738 A | 1/2000 | Breese et al. ................ 707/100 |
| 6,038,573 A | 3/2000 | Parks ......................... 707/513 |
| 6,038,598 A * | 3/2000 | Danneels .................... 709/219 |
| 6,038,601 A | 3/2000 | Lambert et al. ............. 709/226 |
| 6,078,917 A | 6/2000 | Paulsen, Jr. et al. ............ 707/6 |
| 6,092,090 A | 7/2000 | Payne et al. ................ 707/530 |
| 6,105,042 A | 8/2000 | Aganovic et al. ........... 707/500 |
| 6,108,703 A | 8/2000 | Leighton et al. ............ 709/226 |
| 6,119,163 A | 9/2000 | Monteiro et al. ........... 709/227 |
| 6,128,701 A * | 10/2000 | Malcolm et al. ............ 711/133 |
| 6,178,461 B1 | 1/2001 | Chan et al. ................. 709/247 |
| 6,230,171 B1 | 5/2001 | Pacifici et al. .............. 707/512 |
| 6,247,050 B1 | 6/2001 | Tso et al. ................... 709/224 |
| 6,256,747 B1 | 7/2001 | Inohara et al. ................. 714/4 |
| 6,272,536 B1 | 8/2001 | van Hoff et al. |
| 6,330,561 B1 | 12/2001 | Cohen et al. ................ 707/10 |
| 6,377,957 B1 | 4/2002 | Jeyaraman .................. 707/200 |
| 6,408,360 B1 * | 6/2002 | Chamberlain et al. ...... 711/124 |
| 6,442,651 B1 * | 8/2002 | Crow et al. ................. 711/118 |
| 6,505,230 B1 * | 1/2003 | Mohan et al. ............... 709/202 |
| 6,553,420 B1 * | 4/2003 | Karger et al. ............... 709/226 |
| 6,823,374 B1 | 5/2003 | Kausik et al. |
| 6,622,168 B1 * | 9/2003 | Datta ......................... 709/219 |
| 6,829,654 B1 * | 12/2004 | Jungck ....................... 709/246 |
| 6,834,306 B1 * | 12/2004 | Tsimelzon .................. 709/228 |
| 2004/0128618 A1 * | 7/2004 | Datta ......................... 715/513 |

FOREIGN PATENT DOCUMENTS

| | | |
|---|---|---|
| JP | 02001034526 A | 2/2001 |
| WO | WO 00/42519 | 7/2000 |

OTHER PUBLICATIONS

Microsoft Press Computer Dictionary, p. 106, 1994.*
CacheFlow, CacheOS Server Edition 1.0 Management and Configuration Guide, copyright 2000, pp. 1-270.*
Tewari et al., On the Effectiveness of DNS-based Server Selection, Jun. 28, 2000, pp. 1-12.*
Akamai, Fast Content Delivery with FreeFlow, pp. 1-11.*
Mikhailov et al., Embedded Objects in Web Pages, pp. 1-7, Mar. 2000.*
Patent Cooperation Treaty International Preliminary Examination Report of the counterpart PCT application (PCT/US02/17634) of the present pending U.S. Appl. No. (09/998,173).
"Deploying FineGround Condensers in an SSL Environment: A Technical White Paper," FineGround Networks, Inc., <http://www.fineground.com/prod/whitepaper.html>, 2001 pp. 1-5.
"Breaking New Ground in Content Acceleration: A Technical White Paper," FineGround Networks, Inc., <http://www.fineground.com/prod/whitepaper.html>, 2001 pp. 1-9.
"Network Products," Inktomi Corporation, <http://www.inktomi.com/products/network/products/tscclass.html>, 1996-2001, pp. 1-2.

(Continued)

Primary Examiner—Larry D. Donaghue
(74) Attorney, Agent, or Firm—Schwegman, Lundberg, Woessner & Kluth P.A.

(57) ABSTRACT

A proxy implements automated version management of objects embedded in a document to eliminate/reduce network delays associated with requests to validate the objects in a browser (or other) cache. In an exemplary embodiment, the proxy obtains the document, assigns a unique URL to an embedded object, assigns an extended cache life to the object (via a header), updates the object's URL reference in the document, and sends the modified document to the user. When the user requests the object, the proxy obtains the object, attaches the new header, and transmits the object to the user. Because of its extended cache life, the object can subsequently be reused without time-consuming validation with the content server. In another embodiment, storage and validation of objects at the proxy (rather than at the cache) achieves reduced (and faster) validation while allowing refreshing prior to expiration.

28 Claims, 6 Drawing Sheets

OTHER PUBLICATIONS

"Network Products," Inktomi Corporation, <http://www.inktomi.com/products/network/products/cclass_works.html>, 1996-2001, pp. 1-2.

"Network Products," Inktomi Corporation, <http://www.inktomi.com/products/network/products/cclass_tech.html>, 1996-2001, pp. 1-5.

"Network Products," Inktomi Corporation, <http://www.inktomi.com/products/network/products/cclass_edge.html>, 1996-2001, pp. 1-2.

"Network Products," Inktomi Corporation, <http://www.inktomi.com/products/network/products/tseclass.html>, 1996-2001, pp. 1-2.

"Network Products," Inktomi Corporation, <http://www.inktomi.com/products/network/products/tsengine.html>, 1996-2001, pp. 1-4.

* cited by examiner

-PRIOR ART-

PAGE INFO - NETSCAPE

GIF IMAGE 638X53 PIXELS HAS THE FOLLOWING STRUCTURE:

- HTTP://US.YIMG.COM/WW/M5V5.GIF
  ○ IMAGE: HTTP://US.YIMG.COM/I/WW/M5V5.GIF

LOCATION: HTTP://US.YIMG.COM/I/WW/M5V5.GIF
FILE MIME TYPE: IMAGE/GIF
SOURCE: CURRENTLY IN DISK CACHE
LOCAL CACHE FILE: MU1VCOU8.GIF
LAST MODIFIED: THURSDAY, APRIL 14, 1994 5:00:00 PM LOCAL TIME
LAST MODIFIED: FRIDAY, APRIL 15, 1994 12:00:00 AM GMT
CONTENT LENGTH: 5740
EXPIRES: WEDNESDAY, MAY 08, 2002 3:00:00 PM
CHARSET: UNKNOWN
SECURITY: THIS IS AN INSECURE DOCUMENT THAT IS NOT ENCRYPTED AND OFFERS NO SECURITY PROTECTION.

| CALENDAR | MESSENGER | CHECK EMAIL | YAHOO! | WHAT'S NEW | PERSONALIZE | HELP |

DECODED SIZE (BYTES): 15332
IMAGE DIMENSIONS: 302X25 (SCALED FROM 638 X 53)
COLOR: 16-BIT RGB TRUE COLOR.
COLORMAP: (NONE)
TRANSPARENCY: YES, BACKDROP VISIBLE THROUGH TRANSPARENCY

-PRIOR ART-
*FIG. 2*

−PRIOR ART−

METHOD AND SYSTEM FOR EFFICIENT AND AUTOMATED VERSION MANAGEMENT OF EMBEDDED OBJECTS IN WEB DOCUMENTS

CROSS-REFERENCE TO RELATED DOCUMENTS

This application claims priority to and benefit of U.S. provisional patent application No. 60/295,922, filed on Jun. 4, 2001, which is hereby incorporated by reference.

FIELD

The present application relates to accelerating the delivery of content and reducing delays in a networked environment and, in particular, to reducing or eliminating the delays associated with network requests to validate objects in a browser or network cache prior to use via automated version management of embedded objects.

BACKGROUND

It is commonly required to embed one or more objects in a first web document, so that when the first document is downloaded, the embedded objects are downloaded and the ensemble is displayed in a content browser. Such embedded objects may be images encoded in gif, jpeg or other formats, style sheets describing fonts, colors and other layout information, or script files containing browser executables. For example, a news page might contain news images, advertising images, as well user-interface graphics interspersed with text. The text is delivered in the master HTML document, which also carries embedded URL references to the images that are to be included in displaying the document. When the user visits the web page, the browser first downloads the master HTML document, then downloads the embedded images via the URL references, and finally displays the ensemble.

In order to improve performance, browsers typically have caches that store web objects for later use. In particular, although the master HTML document for the news page may be downloaded at each visit to include the latest updates, embedded objects that are already in the browser's cache may be reused, thereby improving network performance. However, when content on the web site changes, such cached objects may cease to be current. In order to maintain currency of cached objects, browsers may validate cached objects with the web server prior to reuse, substituting a validation request in place of the request for the entire object. If the object is unmodified, the server responds with "not modified, use local copy"— saving the browser the inefficiency and delay associated with downloading the entire object. However, when a web page has a large number of such embedded objects, the time required to validate the cached copies of the embedded objects is significant, substantially degrading performance.

In the prior art, individual authors of web documents sometimes eliminate (or, at least, postpone) the validation step by setting long expiry dates on embedded objects. For example, FIG. 1 shows the image http://us.yimg.com/i/ww/m5v5.gif, which constitutes the "Yahoo" logo on the Yahoo home page (http://www.yahoo.com) as of May 25, 2001. FIG. 2 shows the header information carried by the image as presented by the Netscape browser. In particular, the header designates an effective lifetime for the logo of over eight years:

Last-modified date: Fri, 15 Apr 1994 12:00:00 GMT
Expires: Wednesday, May 08, 2002 3:00:00 PM A second version of the logo is http://us.yimg.com/i/ww/m5v4.gif shown in FIG. 3. FIG. 4 shows the header information carried by this image as presented by the Netscape browser. Second image m5v4.gif also carries the same last-modified date and expiry date as first image m5v5.gif. In a document using the second logo rather than the first, it is necessary to replace every reference to the first URL with a reference to the second URL. Furthermore, when creating other (e.g., third, etc.) versions of the image, it is necessary to keep track of all names that were previously assigned. All of the foregoing requires access to the content as it exists at the content server, so that it is not possible to readily take advantage of long expiry dates where one does not control the content server.

Finally, even when one controls the content server, certain types of images cannot be given extended expiry dates because one does not control the content itself. For example, FIG. 5 shows an image, from a wire service news story, having the URL http://us.news1.yimg.com/us.yimg.com/p/nm/20010526/compromise_taxplan_graphic_thu mb.gif. As shown in FIG. 6, the header information for the image does not have an expiry date or last-modified date specified, because the image was not provided with such information by the content provider. Thus, this image must be requested in full for each use.

Also in the prior art, U.S. Pat. No. 6,108,703 to Leighton teaches distributing copies of frequently-requested embedded objects to a network of proprietary hosting servers. In the Leighton system, objects embedded within a document are served from hosting servers distinct from the content server on which the document itself is served. Preferably, there is a network of hundreds of such hosting servers, with the needed objects being hosted on some, but not all, of the hosting servers. When a user needs an embedded object, one particular hosting server is selected to serve that object to the user depending on the user's actual network location as determined by a DNS server. The Leighton patent is directed toward techniques for randomly distributing the embedded objects over a set of virtual server hostnames in a load balanced manner. However, Leighton does not in any way recognize the problem of bandwidth-consuming validation requests from the browser at each use of an object in the browser's cache, much less the desirability of (or techniques for) reducing or eliminating such validation requests.

SUMMARY

The techniques disclosed herein provide systematic, automated and transparent methods and systems for managing versions on large-scale content servers. In particular, methods and systems are disclosed for modifying web (or other networked) documents having embedded objects in order to ensure that the embedded documents may be cached and reused without necessarily requiring validation checks, and yet substantially guaranteeing validity. Reducing or eliminating the validation checks can result in improved performance for the user as well as significant reduction in the usage of server resources and network bandwidth.

In an exemplary embodiment, server software operating as a proxy to the content server performs the foregoing in a transparent manner, without necessarily requiring any changes for this purpose either to the content (as it is provided by the content publisher to the content server), or to most modern content browsers. This can be of commercial significance where modifying content, or distributing special software or configuration instructions to large numbers (perhaps millions) of users, is difficult or impossible.

When the user requests a web document containing embedded objects from the content server, the proxy server passes the request to the content server, receives the content server's response, and dynamically processes the response to: (a) reassign the resource locator for each embedded object in the document to a resource locator that includes validity information for that object; (b) modify the validity settings for each embedded object to be sufficiently[1] long; and (c) modify each resource locator reference to the original embedded object in the document to a resource locator reference to the renamed and modified object. The objects can subsequently be reused, without validation checking, due to the extended validity settings.

[1] This could be done arbitrarily, deterministically, or otherwise, depending on system user and implementation requirements.

In another embodiment, the content server may be modified to incorporate the proxy functionality directly, in place of a separate proxy server. In another embodiment, the proxy server may decide which embedded objects to process, and store copies of the renamed and modified embedded objects for later use. In another embodiment, storage and validation of objects at the proxy (rather than at the cache) achieves reduced (and faster) validation while allowing refreshing prior to expiration. These and other exemplary embodiments, and aspects thereof, will be described in greater detail below.

BRIEF DESCRIPTION OF THE DRAWINGS

FIG. 2 illustrates header information of the logo of FIG. 1.

DETAILED DESCRIPTION

A. An Exemplary Embodiment

Figure 1:
FIG. 1 illustrates a prior art logo at an web address.
Figure 3:
FIG. 3 illustrates a second version of the logo of FIG. 1.
Figure 4:
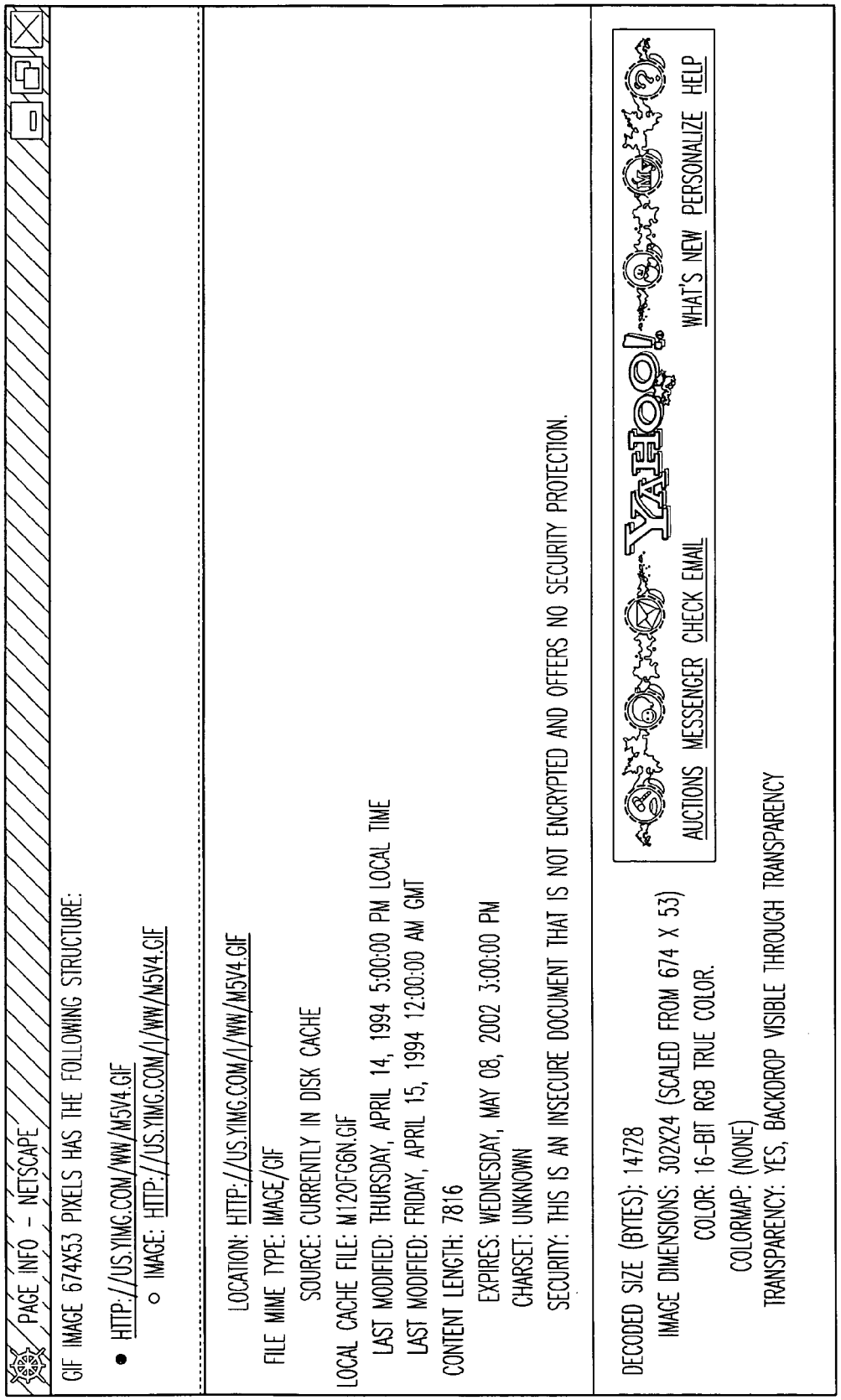
FIG. 4 illustrates header information of the logo of FIG. 3.
Figure 5:
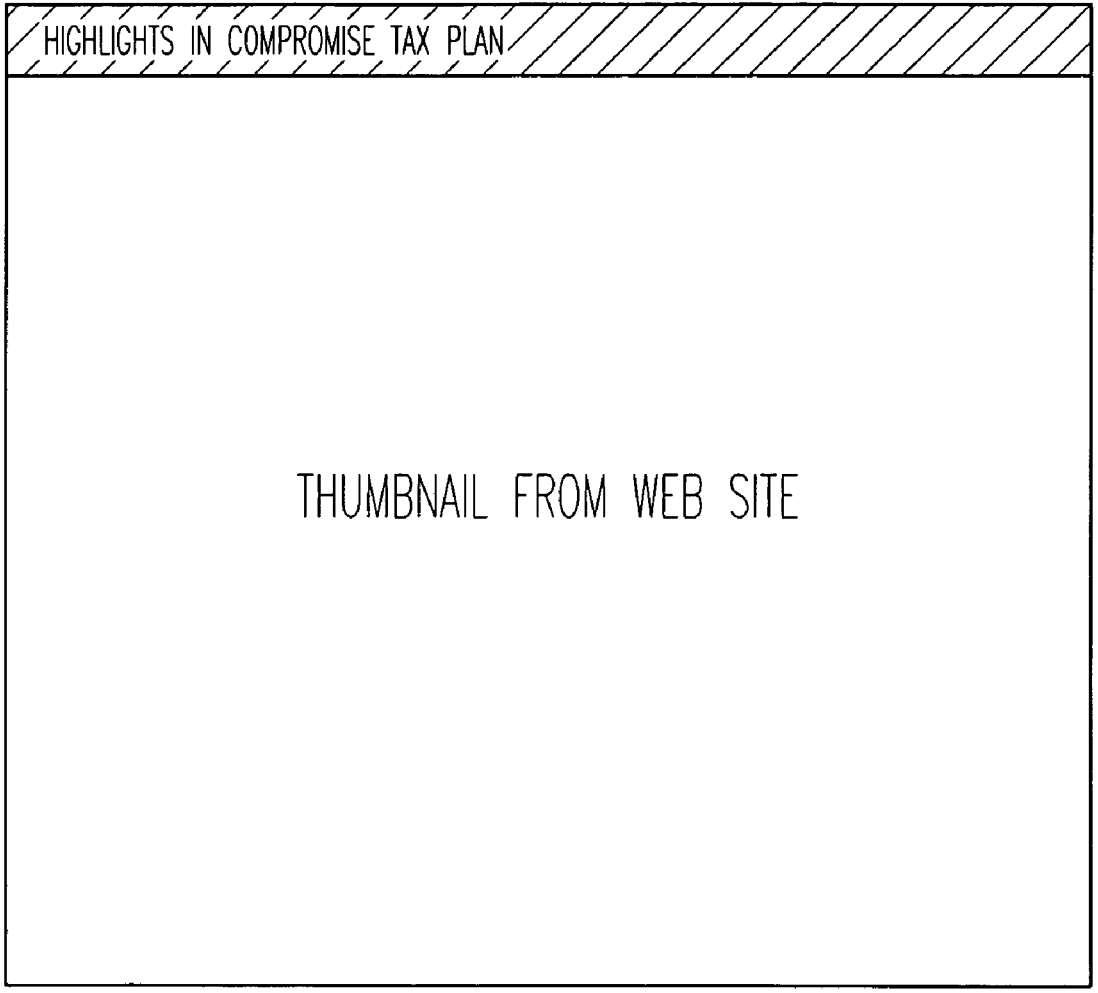
FIG. 5 illustrates another prior art image.
Figure 6:
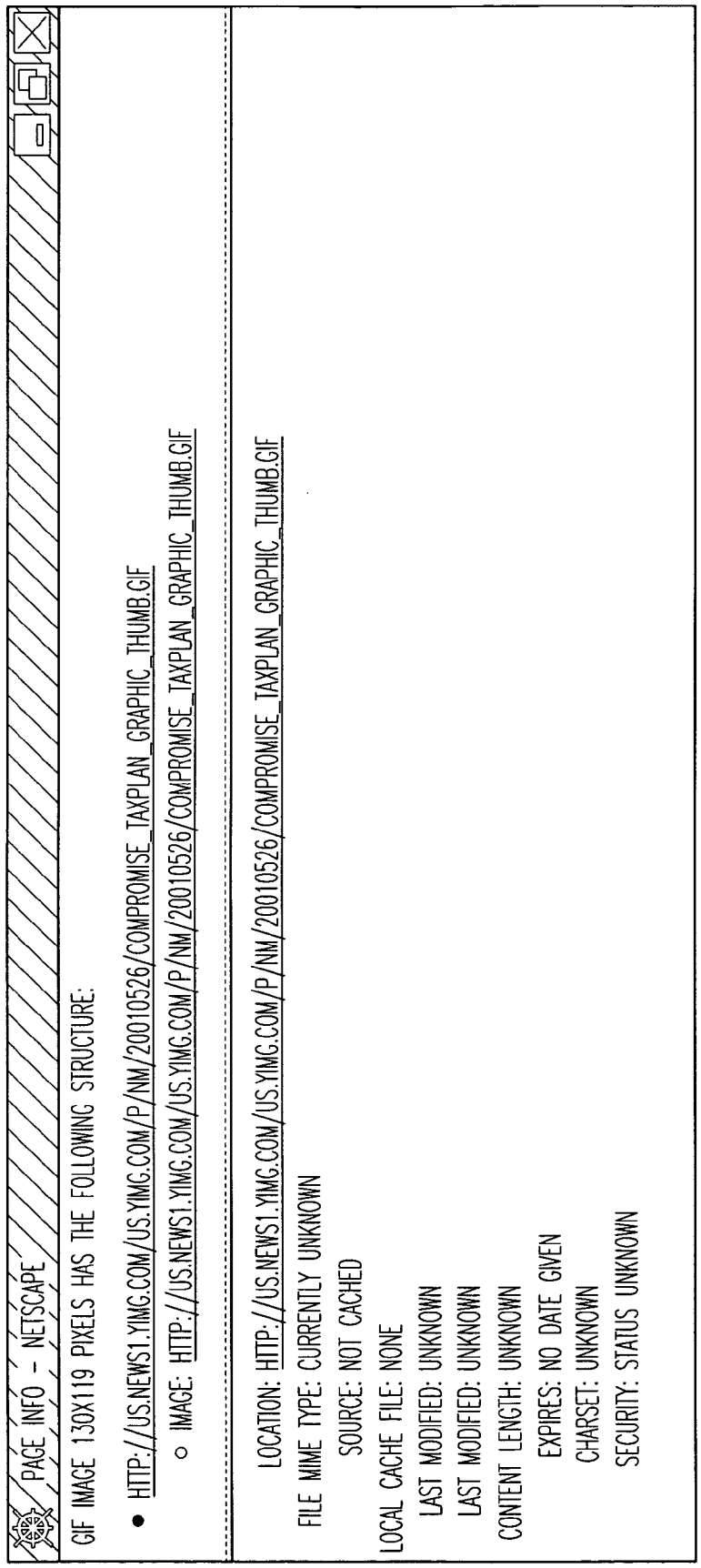
FIG. 6 illustrates header information of the logo of FIG. 5.

For convenience, the techniques herein will be described with respect to "documents" (or, equivalently, "files") which should be understood to include any content-bearing items transmitted in a networked environment, including, without limitation, text, data or graphic files (or combinations thereof), images, objects, programs, scripts, audio, video, and other kinds of documents. More specifically, one embodiment is described with respect to HTML documents carrying embedded objects, but those skilled in the art will understand that the techniques described with respect to this exemplary embodiment readily extend to other forms of documents deliverable on a network.

The system contemplates one or more computers and software running thereon. The computers may be connected by any wired or wireless network including, without limitation, the internet and intranets. The server and/or user/browser computer(s) may be any mainframe, microcomputer, personal computer, web-enabled PDA, cell phone, or other hand-held device, internet television, or other types of devices, with software implemented in Java, C++, or any other language. In a preferred embodiment, a proxy server acts a transparent proxy to a content server. When a user makes a request for a web document from the content server, the request is received by the proxy, and then transparently passed to the content server. The content server then responds with the document containing URL (or other resource locator) references to one or more embedded objects. These objects may be HTML or WML files, GIF or JPEG images, audio, style sheets, script files or objects of yet other types. The proxy then requests each object that is embedded within the document from the content server, and receives each object with a header containing several fields (individually and/or collectively comprising cacheability information) assigned by the content server. As a matter of convenience, we will continue to describe a HTTP embodiment in which the fields (and corresponding rules), that are of relevance to us include at least the following:[2]

[2] Those skilled in the art will readily understand the equivalent fields for other web protocols such as WAP.

Last-modified date: date on which the object was last changed

Cache-control: whether or not the object can be cached, and how long the object can be cached without revalidation. The latter is controlled by the maxage parameter, which specifies the duration (e.g., time in seconds) for which the object can be cached and reused without validation with the content server Entity Tag: Characteristic of object that is used by the content server to identify different versions of the object. This could be the creation date of the object, a hash of the object or a pointer to a database record where the object is stored, etc.

Expiry-date: If the object may be cached, the date until which the object may be reused without checking with the content server These fields and the associated rules,[3] set forth below, provide instructions to a browser on how the object may be stored and reused:

[3] These rules reflect the default settings in common browsers. The individual user may customize these settings, in accordance with the HTTP protocol, in favor of viewing stale content or at risk of increased network traffic. A full discussion of the HTTP protocol and these matters may be found in the W3C standards specification, RFC 2616, www.w3c.org, June 1999, which is well-understood to those skilled in the art and need not be set forth in detail here.

(a) If the cache-control field prohibits caching, the browser may not cache the object. If the cache-control field allows caching or is unassigned, the object may be cached.

(b) If the cache-control field does not prohibit caching, the browser may cache the object and reuse subject to the following:

(i) If the expiry-date is unspecified or prior to the current date, the browser validates the object from the content server, by sending to the content server the URL of the object along with its last-modified date and entity tag. If the object is unchanged, the content server responds that the object is good for reuse. If the object is changed, the content server sends a fresh version of the object. If neither the last-modified date nor the entity tag is specified, the browser fetches the object in full from the content server.

(ii) If the expiry date is specified and is later than the current date, the browser may use the object without checking with the content server.

While the foregoing was described in terms of the browser a similar set of rules apply to network caches as well, as will be appreciated by those skilled in the art.

Basically, the foregoing includes a validation at the browser cache of each object that has expired or cannot be determined to be unchanged. In order to reduce or eliminate the validation requests from the browser (or network) cache as to when an object may be reused (in step (b)(i) above), one embodiment includes deployment of a proxy server to embed an object's usability information within the URL of the object. Specifically, the proxy operates as follows:

(a) Receive a request for a web document from a browser
(b) Forward the request to the content server
(c) Receive the web document from the content server
(d) For each embedded object in the web document:
  (i) Request the object from the content server.
  (ii) Create a modified header for the object comprising: an expiry date sufficiently[1] far in the future; cache-control field omitted or optionally set to enable unrestricted reuse; optionally, if no last-modified date or entity tag is present, a desired[1] last-modified date and/or entity tag. Setting the last modified date allows the object to be time stamped so that when the expiry date is reached, the browser (or network) cache can request the object on the basis of an "if-modified-since the last_modified_date" test. If the object is still unmodified, the object need not be transmitted. Setting the entity tag also allows determination of whether modification has occurred.
  (iii) Reassign the URL of the object to include a code that is sufficiently unique to distinguish the object from prior and anticipated versions of the object. Such a code may be the last-modified date if originally present, a strong hash such as MD5[4] of the contents of the object, or still other unique identifiers known to those skilled in the art.

[4] Applied Cryptography, Bruce Schneier, Allied Press. Also see the HTTP 1.1 standard.

(iv) Associate the reassigned URL, the modified header and the original URL.
  (v) Within the web document, replace all occurrences of the original URL of the object with the reassigned URL.
(e) Send the modified web document to the user.
(f) When the user requests an embedded object via its reassigned URL (e.g., by clicking on a link for an embedded object in the web document), use the association in step (d)(iv) to determine the original URL corresponding to the reassigned URL, fetch the object corresponding to the original URL from the content server to the proxy, replace the original header with the modified header, and forward the object (with its reassigned last-modified date, expiry date, and cache-control settings) to the user.

Since the expiry date on these objects is sufficiently[1] far in the future, the browser is free to subsequently reuse these objects without additional validation from the content server. The presence of the last-modified date or the entity tag ensures that even if the user forces the browser to refresh these objects in the browser cache, the browser will do so with a limited validation request conditional on the last-modified date or the entity tag, as opposed to an unrestricted validation request. If neither the last-modified date nor the entity tag is present, the browser requests the objects in full.

B. Example

The document modification portion (steps (a)–(d)) of the foregoing technique will now be illustrated with respect to a web document that contains one embedded object, as shown below.
<html>
. . .
<img src="images/button.gif">
. . .
</html>

When a user requests the web document (step (a)), the proxy retrieves the document from the content server (steps (b) & (c)), and then retrieves the embedded object images/button.gif (step (d)(i)), which has the following properties as delivered by the content server
Content type: image/gif
Last-modified: Fri, 15 April 2000 03.00.01 GMT The proxy sets the expiry date to a date in the future, say, 20 years later (step (d)(ii)). Assuming that various versions of the embedded object button.gif can be distinguished on the basis of their date of modification, it is sufficient to reassign the URL to images/button_4_15_00_.gif or images/4_15_00_button.gif, in order to the distinguish various versions (step (d)(iii)). Next (step (d)(iv)), the proxy associates a stored copy of the image with
URL: images/4_15_00_03.00.01_button.gif
Content type: image/gif
Last-modified: Fri, 15 April 2000 03.00.01 GMT
Expires: Fri, 15 Apr 2020 00.00.00 GMT The proxy also modifies all embedded references within the HTML document to refer to the reassigned URL as below (step (d)(v)).
<html>
. . .
<img src="images/4_15_00_03.00.01_button.gif">
. . .
</html>

The effect of these modifications is that the user is free to use the object referenced by the reassigned URL at any time prior to the expiry date, without necessarily requiring revalidation with the content server.[5]

[5] Of course, certain implementations may choose to include occasional validation for the purposes of double-checking, ensuring document integrity, etc.

C. Performance Testing

An implementation of the proxy server was constructed using C++ running on a Linux platform on a Dell server having an Intel Pentium processor, 512 KB of RAM and 10 GB of disk drive. The following exemplary performance metrics for downloading various web pages of moderate complexity, with and without the proxy server, were taken using the MyVital Agent measurement tool from Lucent Technologies:

| Connection Type | Connection Speed | Download Time w/o Proxy Server | | Download Time w/Proxy Server | |
|---|---|---|---|---|---|
| | | 1st Visit | Later Visits | 1st Visit | Later Visits |
| T-1 | 927 kbs | 4.1 sec | 3.8 sec | 5.4 sec | 0.5 sec |
| 56 kb Modem | 49 kbs | 16.7 sec | 8.1 sec | 18.5 sec | 0.9 sec |

In the first visit using the proxy, download times are typically increased slightly (in this exemplary implementation, by 11 to 13%) due to the fact that objects make two trips across the internet, one from the content server to the proxy server, and another from the proxy server to the browser. In subsequent visits using the proxy server, download times are substantially decreased (in this exemplary implementation, by an average of 87 to 89%, corresponding to a performance increase of 7.6× to 8.8×).

D. A Second Embodiment (with Proxy-Based Validation)

In the above-described exemplary embodiment, each embedded object was fetched from the content server when a web document was processed by the proxy (step (f)). In another (typically more efficient) embodiment, the proxy may store a copy of the object retrieved during step (d)(i) and validate its stored copy of the embedded object with the content server, rather than fetching it in its entirety at step (f). In particular, the stored copy can be checked against the content server upon each use by the proxy, or at regular or otherwise, determined intervals. If the object has changed at the content server, the proxy would replace its copy with the fresh version of the object. Especially where the proxy and the content server are at the same network location (or relatively close to each other), such communication does not entail network delays (or only minimal delays).

Optionally, the proxy can be configured to handle some embedded objects using the techniques disclosed herein, while leaving other designated objects unprocessed. Also optionally, when the proxy includes storage, the distinguishing code for reassigned URLs can simply be large random strings that are bound to the stored versions of the object. Such strings are practically unique by virtue of their length, resulting in further efficiency.

An exemplary implementation of the second embodiment would operate as follows:

(a) Receive a request for a web document from a browser
(b) Forward the request to the content server
(c) Receive the web document from the content server
(d) For each embedded object in the web document:
  (i) If the object is already in storage at the proxy (e.g., from having been used in connection with another document), refresh (if necessary) the stored copy of the object against the content server[6] [i.e., skip to step (f)].
  [6] Perhaps using the condensation techniques disclosed in co-pending U.S. patent application Ser. No. 09/634,134, 09/816,802 and/or 09/838,822,
  (ii) Create a modified header comprising: an expiry date sufficiently[1] in the future; cache-control field omitted or optionally set to enable unrestricted reuse; optionally, if no last-modified date or entity tag is present, a desired[1] last-modified date and/or entity tag
  (iii) Reassign the URL of the object to include a code that is sufficiently unique to distinguish the object from prior and anticipated versions of the object. Such a code may be the last-modified date if originally present, a strong hash such as MD5 of the contents of the object, a sufficiently long string of random characters to guarantee uniqueness with certainty in all practicality, or still other unique identifiers known to those skilled in the art.
  (iv) Associate the reassigned URL, the modified header and the original URL.
  (v) Optionally, store a copy of the object in the proxy.
  (vi) Within the web document, replace all occurrences of the original URL of the object with the reassigned URL.

(e) Send the modified web document to the user.
(f) When the user requests an embedded object via its reassigned URL, determine the original URL corresponding to the reassigned URL.
  (i) If the object is in storage, optionally validate the object against the content server and refresh as necessary.[6] If the object is not in storage, fetch the object having a modified header but otherwise corresponding to the original URL from the content server.
  (ii) Send the user a copy of the object with the modified header.

This embodiment allows an object processed by a proxy in connection with a first web document to be reused in connection with processing of a second web document. This embodiment could also be used (depending on system configuration) to allow an object to be validated at the proxy for re-use in the same web document. For example, when an object referenced in one (or more) documents is frequently requested (e.g., by multiple users), it suffices to periodically validate the object (e.g., say, once every five seconds). In other words, the validation requests of the different users can be aggregated, so that a response to a second user's request can use a response generated with regard to a different user. That is, in this embodiment, the "user" in step (f) could be, but need not be, the same "user" who previously requested the object.

Although this embodiment does not eliminate validation entirely,[7] those validations that do occur happen at the proxy which is typically closer to the content server (than is the browser) and, therefore, results in reduced network delays. In addition, the number of validations is typically reduced with the use of extended-lifetime techniques such as future expiry dates (as in the first-described embodiment). Thus, storage and validation of objects at the proxy (rather than at the cache) achieves reduced (and faster) validation while still accommodating refreshing of documents where needed.
[7] As was possible in the previous embodiment, except for user-forced refresh of objects in the browser cache, which refresh is performed using a limited validation request.

E. Other Embodiments and Aspects

While the foregoing exemplary embodiments have been described in terms of a transparent proxy altering the content in substantially real-time as it is served to the end-user, those skilled in the art will realize that in an aspect of the exemplary embodiment or in an alternate embodiment, the techniques presented herein may also be carried out on the web document prior to actual user demand therefor.

In another aspect or embodiment, any or all of the foregoing techniques may be directly integrated into content server software to dynamically alter the content as it is served to the end-user. This is particularly appropriate for those content servers which generate web documents dynamically (e.g., by executing programmatic descriptions of web documents in conjunction with data from a database to fill in variables in the programmatic description), resulting in a web document that is customized to the circumstance and the user.

In yet another aspect or embodiment, instead of setting the expiry date, the proxy may set the last modified date (e.g., to the current time or some other relatively recent value) to indicate freshness for objects that carry neither a last-modified date nor an expiry date. In this case, the browser carries out a validation request of its cached copy of the object, whereas it previously fetched a fresh copy of the object from the content server to the browser (or other cache) at each use. When the browser makes such a validation request, the proxy will fetch the object in full from the content server and compare the cached copy with the fresh copy. If the two are identical, the proxy responds that the object is unchanged. If the two are different, the proxy will replace the cached copy with the fresh copy, setting its last-modified date to be the current date, as well as transmit the newly cached copy to the browser. Indeed, those skilled in the art will recognize that there are many combinations of the last-modified date, the cache-control field, the expiry date and the entity tag that will offer the same end result of reduced validation traffic from a browser or network cache. For example, setting the maxage parameter in the cache-control field is effectively equivalent to setting the expiry date, and in fact overrides the expiry date. While the number of such combinations are large, as is evident from the HTTP standards document referenced here, the techniques disclosed herein are applicable via any of these combinations.

Finally, while the various exemplary embodiments have been described in terms of software running on a general purpose computer, those skilled in the art will readily appreciate that the techniques described herein could equally well be implemented in terms of a pure hardware solution (e.g., ASICs, programmable logic devices, etc.) or some combination of software and hardware (e.g. firmware, microcode, etc.).

What is claimed is:

1. A method for operating a proxy disposed between a user and a document accessible to said user over a computer network, comprising:
    obtaining an electronic document identifiable by a network address of said document, including one or more references to one or more embedded objects, each said one or more embedded objects being identifiable by a preexisting network address therefor;
    for at least one of said one or more embedded objects, facilitating storage and re-use thereof from a cache accessible to said user, without requiring user validation of said one or more embedded objects upon said re-use, by specifying a new network address uniquely identifying said one or more embedded objects, and specifying cacheability information for said one or more embedded objects;
    modifying said documents by replacing said preexisting address for said one or more embedded objects with said new network address;
    transmitting said modified document to said user;
    receiving a user request for at least one of said embedded objects; and in response to said request:
        transmitting said cacheability information to said requesting user;
    evaluating the validity of said requested object, using information from said user request; and
        transmitting an outcome of said validity evaluation to said requesting user.

2. The method of claim 1 where said proxy is implemented as an intermediary server located between a computer of said user and a server of said document.

3. The method of claim 1 where said new network address has at least a portion in common with said preexisting network address.

4. The method of claim 1 where modifying said cacheability information includes extending a long expiry date.

5. The method of claim 1 where modifying said cacheability information includes modifying a long maxage parameter.

6. The method of claim 1 where said cacheability information includes a relatively recent last modified date.

7. The method of claim 1 where said cacheability information includes how long said embedded object can be cached without revalidation.

8. The method of claim 1 where said proxy is co-located at a server of said document.

9. The method of claim 8 where said document is dynamically generated at said server.

10. The method of claim 9 where said dynamic generation includes executing a programmatic description of said document in conjunction with data for at least one variable in said programmatic description.

11. The method of claim 1 further comprising storing said one or more embedded objects at said proxy for later use.

12. The method of claim 1 further comprising refreshing said one or more embedded objects using condensation techniques.

13. The method of claim 1, where transmitting said cacheability information to said requesting user, evaluating the validity of said requested object, and transmitting the outcome of said validity evaluation to said requesting user include:
    determining said preexisting network address for said embedded object;
    fetching said embedded object from said preexisting network address;
    replacing said cacheability information in said embedded object; and
    forwarding said embedded object in response to said request.

14. The method of claim 1, wherein evaluating the validity of said requested object includes validating said embedded object against a content server.

15. The method of claim 1, wherein transmitting the outcome of said validity evaluation to said requesting user includes instructing said user to use a copy of said embedded object accessible to said user.

16. The method of claim 1, further comprising transmitting to said user a version of said embedded object.

17. A computer-readable medium comprising program logic instructions for operating a proxy disposed between a user and a document accessible to said user over a computer network, in order to facilitate re-use of objects within said document from a cache without requiring user validation of said objects upon re-use, said instruction when executed:
    obtaining an electronic document identifiable by a network address of said document, including one or more references to one or more embedded objects, each said one or more embedded objects being identifiable by a preexisting network address therefor;
    for at least one of said one or more embedded objects facilitating storage and re-use thereof from a cache accessible to said user, without requiring user validation of said one or more embedded objects upon said re-use, by specifying a new network address uniquely identifying said one or more embedded objects, and specifying cacheability information for said one or more embedded objects;
    modifying said document by replacing said preexisting address for said one or more embedded objects with said new network address;
    transmitting said modified document to said user;
    receiving a user request for at least one of said embedded objects; and in response to said request:
        transmitting said cacheability information to said requesting user;

evaluating the validity of said requested object, using information from said user request; and transmitting an outcome of said validity evaluation to said requesting user.

18. The computer-readable medium of claim 17 where said new network address has at least a portion in common with said preexisting network address.

19. A device configured to facilitate re-use of objects within said document from a cache comprising:

resources for obtaining an electronic document identifiable by a network address of said document, including one or more references to one or more embedded objects, each said one or more embedded objects being identifiable by a preexisting network address therefor;

resources for facilitating storage and re-use of at least one of said one or more embedded objects, from a cache accessible to said user, without requiring validation of said one or more embedded objects upon said re-use, by specifying a new network address uniquely identifying said one or more embedded objects, and specifying cacheability information for said one or more embedded objects; resources for modifying said document by replacing said preexisting address for said one or more objects with said new network address;

resources for transmitting said modified document to said user;

resources for receiving a user request for at least one of said embedded objects;

resources for transmitting said cacheability information to said requesting user; and resources for evaluating the validity of said requested object, using information from said user request.

20. The device of claim 19, further comprising:

resources for transmitting an outcome of said validity evaluation to said requesting user.

21. The device of claim 19 where the device is implemented as an intermediary server located between a computer of said user and a server of said document.

22. The device of claim 19 where said new network address has at least a portion in common with said preexisting network address.

23. A method for operating a proxy disposed between a user and a document accessible to said user over a computer network, in order to facilitate re-use of objects within said document from a cache instead of necessarily requiring downloading said objects upon each use, comprising:

obtaining an electronic document identifiable by a network address of said document, including one or more references to one or more embedded objects, each said one or more embedded objects being identifiable by a network address therefor;

for at least one of said one or more embedded objects, facilitating storage and re-use thereof from a cache accessible to said user, without requesting said one or more embedded objects upon said use, by specifying cacheability information for said one or more embedded objects that permits caching thereof, including an entity tag uniquely identifying said one or more embedded objects, and specifying a required validation of said one or more embedded objects;

transmitting said modified document to said user;

receiving a user request for at least one of said embedded objects; and in response to said request:

transmitting said cacheability information to said requesting user;

evaluating the validity of said requested object, using information from said user request; and transmitting an outcome of said validity evaluation to said requesting user.

24. The method of claim 23 wherein:

said validity evaluation does not indicate invalidity; and further comprising instructing said user to use a copy of said embedded object accessible to said user.

25. The method of claim 23, where:

said validity evaluation indicates invalidity; and further comprising transmitting to said user a version of said embedded object.

26. A method of managing content delivery comprising:

at a content server proxy, receiving a content request from a user for content provided by a content server;

receiving the content transmitted from the content server to the content server proxy;

dynamically processing the content with the content server proxy, wherein dynamically processing the content comprises, reassigning a resource locator for an embedded object of the content to a modified resource locator which includes a header having validity data for the embedded object, modifying the validity data to include a future date, and modifying each reference to the embedded object contained in the content to the modified resource locator; and transmitting the dynamically processing the content to the user.

27. The method of claim 26 wherein dynamically processing the content further comprises setting a last modified date of the header for the embedded object.

28. A method of managing content delivery comprising:

at a content server proxy, receiving a content request from a user for content provided by a content server;

receiving the content transmitted from the content server to the content server proxy, wherein the content has an associated resource locator with a header specifying cache control information for the content, the cache control information comprising an expiration date, a last modified date and a cache control field indicating if the content can be cached;

dynamically processing the content with the content server proxy, wherein dynamically processing the content comprises modifying the header expiration date to a future date, modifying the header last modified date to a date corresponding to a current date, and modifying the header cache control field to allow caching of the content; and transmitting the dynamically processing the content to the user.

* * * * *